J. D. RENNE.
DUMPING MECHANISM FOR AUTOMOBILE TRUCKS.
APPLICATION FILED SEPT. 18, 1919.
1,433,743.
Patented Oct. 31, 1922.
2 SHEETS—SHEET 1.
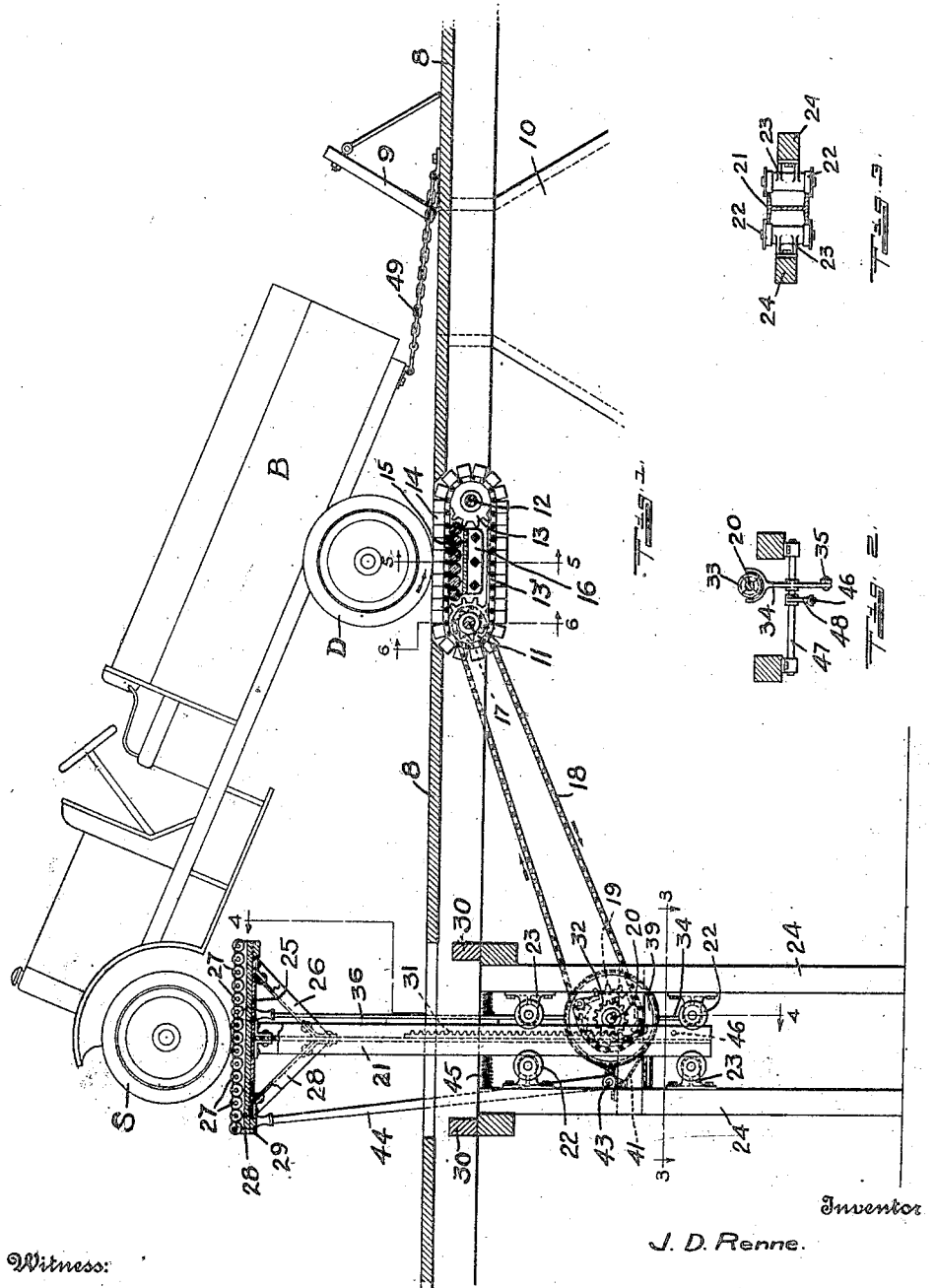
Inventor
J. D. Renne.
Witness:
A. W. Jamieson.
By David O. Barnell.
Attorney.

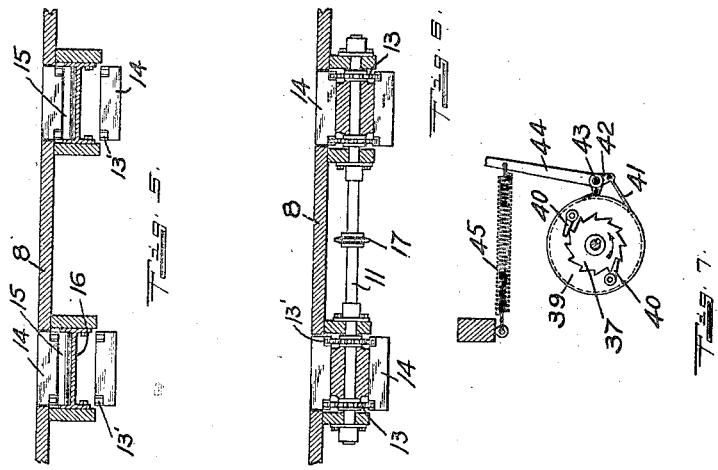

Patented Oct. 31, 1922.

1,433,743

UNITED STATES PATENT OFFICE.

JAMES D. RENNE, OF KIMBALL, NEBRASKA.

DUMPING MECHANISM FOR AUTOMOBILE TRUCKS.

Application filed September 18, 1919. Serial No. 324,323.

*To all whom it may concern:*

Be it known that I, JAMES D. RENNE, a citizen of the United States, and a resident of Kimball, in the county of Kimball and State of Nebraska, have invented certain new and useful Improvements in Dumping Mechanism for Automobile Trucks, of which the following is a specification.

My invention relates to dumping mechanism for use with motor vehicles not provided in themselves with devices for facilitating the dumping or unloading thereof, and is particularly adapted for use in mills, elevators and the like, for unloading grain from the class of motor trucks which are now largely used instead of horse-drawn vehicles for transporting grain from farms to market. It is the object of my invention to provide a dumping mechanism of the general character indicated, wherein the power for the operation of the mechanism may be derived from the motor-vehicle itself, and to provide suitable controlling means by which the dumping operation may be readily and safely effected.

In the accompanying drawings Fig. 1 is a longitudinal vertical sectional view, showing in partial elevation a dumping mechanism embodying my invention. Fig. 2 is a detail vertical section on the line 2—2 of Fig. 4. Fig. 3 is a detail horizontal section on the line 3—3 of Fig. 1. Fig. 4 is a vertical transverse section on the line 4—4 of Fig. 1. Figs. 5 and 6 are detail transverse vertical sections on the lines 5—5 and 6—6, respectively, of Fig. 1, and Fig. 7 is a detail vertical section on the line 7—7 of Fig. 4.

In carrying out my invention the mechanism is usually arranged in the floor of a platform or elevated driveway 8, having therein a door 9 opening to a dump-pit or bin 10, to which the grain or other material is to be delivered from the vehicle driven onto the platform. Adjacent to the pit-door 9 the platform or floor has two laterally spaced longitudinal openings therein, in which are disposed tread-mill devices comprising horizontal longitudinally spaced shafts 11 and 12 carrying pairs of sprocket-wheels 13 around which are extended endless chains 13', said chains carrying tread-blocks 14 arranged so that at the upper sides of the devices said blocks extend through the openings in the floor, with their upper surfaces substantially flush with the floor, as shown in Figs. 1, 5 and 6. The upper horizontally extending portions of the chains 13' are supported by a plurality of rollers 15 which are arranged beneath the same and supported by bearing-members 16, as shown in Figs. 1 and 5. The shaft 11 is connected with both of the tread-mill devices, the latter being arranged so as to receive upon the upper portions thereof the drive-wheels D of a motor-truck when the rear end of the truck-body B is in proper position to discharge the load thereof into the dump-pit. On the central portion of the shaft 11 is a sprocket-wheel 17 from which a chain 18 is extended forwardly and downwardly to a sprocket-wheel 19, the latter being mounted revolubly upon a shaft 20 from which are driven the devices for elevating the front portion of the motor-truck.

The elevating devices comprise a pair of vertically movable columns 21 which are guided between pairs of rollers 22, the latter being carried by bearing-brackets 23 mounted upon pairs of posts 24 arranged beneath the platform 8, as shown. Each column 21 carries a horizontal longitudinally extending head-plate 25 of which the end-portions are supported by diagonal braces 26, and at the sides of said head-plates are vertical flanges in which are journaled the ends of a series of transversely extending rollers 27. The columns are so arranged, both transversely and longitudinally of the platform, that the front wheels S of the motor-truck will rest upon the rollers 27 when the rear wheels D are in position upon the tread-mill devices, the length of the head-plates being made such as to provide for the usual variation in the length of wheel-base of different vehicles. On each head-plate 25, beneath the rollers 27 and between the side-flanges of the plate, there is arranged a stop-plate 28 having at the ends thereof cleats 29 which extend down at the ends of the head-plate. When the columns are in the lowered position thereof said cleats rest upon transverse beams 30, which hold the stop-plate up against the lower sides of the rollers 27, thereby serving as a brake to prevent rotation of the rollers. When the columns are raised, the stop-plates drop out of engagement with the rollers and leave the same free to revolve.

Each of the columns 21 is provided at one side with a rack 31 having teeth meshing with the teeth of pinions 32 carried at the ends of the shaft 20. On the intermediate portion of said shaft a clutch-collar 33 is mounted slidably, said collar being connected with the shaft by means of a spline, so as to be non-rotatable thereon. The hub of the sprocket-wheel 19 is provided with clutch-jaws adapted to interengage with similar jaws on the collar 33, so that, by moving the collar toward the wheel to engage the clutch-jaws, the wheel is connected with the shaft so as to drive the same. Movement of the clutch-collar 33 is controlled by a forked lever 34, arranged as shown in Fig. 4, the lower end of said clutch-lever being connected by a horizontal laterally extending rod 35 with the lower end of a hand-lever 36, of which the upper end extends up through a slot in the platform 8.

Adjoining the side of the sprocket-wheel 19 opposite the clutch-collar, a ratchet-wheel 37 is keyed to the shaft 20, and a brake-drum 39 is mounted revolubly upon the shaft between said ratchet-wheel and a collar 38. Pawls 40 pivoted on the side of the brake-drum are engageable with the ratchet-wheel so as to transmit therefrom to the drum movement of the shaft in the direction in which the latter is moved during lowering of the columns 21. A brake-band 41 extends around the brake-drum, as best shown in Fig. 7, the ends of said brake-band being connected with arms 42 on a shaft 43. Said shaft 43 extends out laterally as shown in Fig. 4, and is provided at the end with a hand-lever 44 which extends upwardly through a slot in the platform 8. A spring 45 is connected with the lever 44 and tends to move the same in a direction such as to tighten the brake-band and thereby prevent rotation of the drum.

Between the lower portions of the columns 21 there is a transversely extending rod 46. On the pivot-shaft 47 of the clutch-lever 34 there is secured an arm 48 which is so arranged as to be engaged by said rod 46 when the columns 21 are raised to the position shown in Fig. 4. Upward movement of the engaged end of said arm 48 moves the clutch-collar 33 so as to disengage the same from the sprocket-wheel 19, thus automatically stopping the raising of the columns when the same reach their maximum desired elevation.

The operation of the mechanism as a whole is as follows: The columns 21 being in lowered position, with the rollers 27 on the head-plates substantially flush with the surface of the platform, the motor-truck is driven into place so that the front wheels S rest upon the head-plate rollers, and the rear wheels D rest upon the tread-mill blocks 14. One or more chains 49, having their ends fixedly secured to the platform near the pit-door, are then connected with the truck-body so as to prevent forward movement thereof. Power is then applied to the drive-wheels D, as when driving the vehicle forwardly, and the motion of said wheels is communicated by the tread-mill devices to the sprocket-wheel 19 on the shaft 20. The lever 36 is then moved to engage the clutch-collar 33 with said sprocket-wheel 19, whereupon the shaft 20 is driven in the proper direction for elevating the columns and raising the front portion of the truck to incline the body thereof to the dumping position shown in Fig. 1. During the raising of the columns the ratchet-wheel 37 moves in the direction indicated in Fig. 7, thus passing freely beneath the pawls 40, and allowing the brake-drum 39 to remain stationary. The upward movement of the columns may be stopped at any time by moving the hand-lever 36 to disengage the clutch-collar from the sprocket-wheel 19, and at the limit of upward movement the clutch is thrown out automatically by the engagement of the rod 46 with the arm 48. When the clutch is thrown out, either by hand or automatically, downward movement of the columns is prevented by the brake-drum, the same being held stationary by the engagement of the brake-band therewith, the brake-band being held tight by the spring 45, and the pawls 40 engaging the ratchet-wheel 37 to prevent the reverse rotation of the shaft 20. When it is desired to lower the truck to the horizontal position, the brake-lever 44 is moved in opposition to the spring 45, to loosen the brake-band sufficiently to permit rotation of the brake-drum together with the ratchet-wheel and drive-shaft 20. The columns are thus permitted to descend at a controlled rate, being actuated by their own weight and that of the portion of the motor-truck which is supported thereon. After the columns have reached their normal lowered position, the chains 49 are disconnected from the truck-body, and the vehicle driven on across the platform. The rollers 27, upon the column head-plates, enable the mechanism to be used with motor-trucks having four-wheel drive, in which case the front wheels of the truck merely turn idly, spinning the rollers upon which they rest, while the rear wheels serve, as before, to drive the tread-mill device and elevate the front portion of the truck to the dumping position. The stop-plate 28, by preventing rotation of the rollers 27 when in the lowered position, enable the truck to be driven over the rollers without causing loss of traction when the drive-wheels D engage the same. The normal frictional resistance to the movement of the tread-mill devices is sufficient to prevent movement thereof when driving the truck into place thereon, and before preventing forward movement of the truck by the attachment thereto of the anchor-chains 49.

Now, having described my invention, what I claim and desire to secure by Letters Patent is:

1. A dumping mechanism for motor vehicles, comprising vertically movable members arranged to support the front portion of the vehicle, tread-mill devices arranged to be engaged by the drive-wheels of the vehicle, connecting driving means between the treadmill devices and the vertically movable members whereby the former may actuate the latter to elevate the same and the portion of the vehicle supported thereon, said connecting driving means including a clutch, and manually actuated means for controlling said clutch.

2. A dumping mechanism for motor vehicles, comprising vertically movable members arranged to support the front portion of the vehicle, tread-mill devices arranged to be engaged by the drive-wheels of the vehicle, connecting driving means between the treadmill devices and the vertically movable members whereby the former may actuate the latter to elevate the same and the portion of the vehicle supported thereon, and braking means for controlling descent of the vertically movable members.

3. A dumping mechanism for motor vehicles, comprising vertically movable members arranged to support the front portion of the vehicle, tread-mill devices arranged to be engaged by the drive-wheels of the vehicle, connecting driving means between the treadmill devices and the vertically movable members whereby the former may actuate the latter to elevate the same and the portion of the vehicle supported thereon, said connecting driving means including a clutch, and means for automatically throwing out said clutch at a limit of elevation of the vertically movable members.

4. A dumping mechanism for motor vehicles, comprising vertically movable members arranged to support the front portion of the vehicle, tread-mill devices arranged to be engaged by the drive-wheels of the vehicle, connecting driving means between the treadmill devices and the vertically movable members whereby the former may actuate the latter to elevate the same and the portion of the vehicle supported thereon, a brake member, means normally retarding movement thereof, and means operatively connecting said brake member with the vertically movable members to resist only downward movement thereof.

5. A dumping mechanism for motor vehicles, comprising vertically movable members arranged to support the front wheels of the vehicle, tread-mill devices arranged to be engaged by the drive-wheels of the vehicle, connecting driving means between the treadmill devices and the vertically movable members whereby the former may actuate the latter to elevate the same and the portion of the vehicle supported thereon, said connecting driving means including a clutch, means for automatically throwing out said clutch to stop elevating of the vertically movable members at a determined limit, a brake device operatively connected with the vertically movable members to resist descent thereof, and manually operable means for controllably releasing said brake device.

6. In a mechanism of the class herein described, a vertically movable supporting device having a plurality of rollers adapted for engagement with wheels of the vehicle, members engageable with said rollers to retard rotation thereof, and means for pressing said rotation-retarding members against the rollers when the supporting device is in normal lowered position only.

7. In an apparatus of the class described, a platform for receiving the forward wheels of a motor driven vehicle, means for elevating said platform, and means operative by the motor of the vehicle for actuating the elevating means of said platform to tilt the vehicle into load discharging position.

8. In an apparatus of the class described, a platform for receiving the forward wheels of a motor driven vehicle, rack bars, means for coupling said rack-bars to the platform, a shaft carrying pinions engaging said racks, means for causing the rotation of said shaft, and means operative by the motor of the vehicle for actuating the shaft rotating means to cause the rack-bars to move the vehicle into load discharging position.

9. In an apparatus of the class described, a platform for receiving the forward wheels of a motor driven vehicle, means for elevating said platform, means operative by the motor of the vehicle for actuating the platform elevating means to tilt the vehicle into load discharging position, means for holding the platform in elevated position, and a brake device for controlling the return movement of the platform and the vehicle supported thereby.

JAMES D. RENNE.